United States Patent [19]

Ramos

[11] Patent Number: 4,919,552
[45] Date of Patent: Apr. 24, 1990

[54] MACHINE BEARING
[75] Inventor: Ivo Ramos, Sao Paulo, Brazil
[73] Assignee: Industria Plastica Ramos S.A., Brazil
[21] Appl. No.: 211,979
[22] Filed: Jun. 27, 1988
[51] Int. Cl.$^5$ .............................................. F16C 33/32
[52] U.S. Cl. ..................................... 384/492; 384/527
[58] Field of Search ................ 384/490, 491, 492, 527

[56] References Cited
U.S. PATENT DOCUMENTS

| | | | |
|---|---|---|---|
| 2,534,929 | 12/1950 | Schultz et al. | 384/492 X |
| 2,724,624 | 11/1955 | Barr | 384/492 |
| 3,027,626 | 4/1962 | Murphy | 384/527 X |
| 3,212,833 | 10/1965 | Sloan et al. | 384/492 |
| 4,606,657 | 8/1986 | Tanaka | 384/492 |

Primary Examiner—Thomas R. Hannon
Attorney, Agent, or Firm—Nutter, McClennen & Fish

[57] ABSTRACT

A machine bearing for underwater use has a central shaft interconnected to an outer shell or cover by a spacer or cage which locates balls in predetermined spaces around inner and outer races between the shaft and cover. The shaft and cover are made of nylon, PTFE, acetalic resin or similar material; the balls are made of glass.

1 Claim, 1 Drawing Sheet

MACHINE BEARING

The present invention relates generally to a bearing for a machine, and more specifically to a bearing which does not require lubricants or greases, that is suitable for several industrial fields and particularly to submarine activities.

BACKGROUND OF THE INVENTION

Bearings are conventionally made of stainless steel, provided with balls also made of steel. They are frequently used in all kinds of machines and industries for different purposes.

The majority of movable elements require the utilization of bearings which must be greased often besides requiring several maintenance steps in order to provide the minimum friction action.

SUMMARY OF THE INVENTION

According to present invention, a bearing is made of nylon, PTFE, acetalic resin or the like and provided with glass balls positioned in the bearing race that form the internal chain with relation to bearing itself.

This kind of bearing does not require the utilization of grease or the like and it is intended to be used in submersible apparatus and the like, without the need of maintenance. It is also suitable for utilization in several industries in order to substitute advantageously for those steel bearings which have been used up to now.

Accordingly, the main objective of the present invention is to provide a rigid bearing that is suitable for utilization under several adverse conditions without the need of maintenance.

Other objects will, in part, be obvious and will, in part, appear hereinafter. The invention accordingly comprises the features of construction, combination of elements and arrangements of parts which will be exemplified in the following detailed description, and the scope of the invention will be indicated in the claims.

BRIEF DESCRIPTION OF THE DRAWING

The objectives of the invention, as well as the main characteristics of the bearing and the advantages stemming therefrom, will be better understood from the description presented hereafter wherein a preferred, but not limitative, embodiment is described in connection with the drawing attached hereto, wherein.

DESCRIPTION OF THE PREFERRED EMBODIMENT

Figure 1:
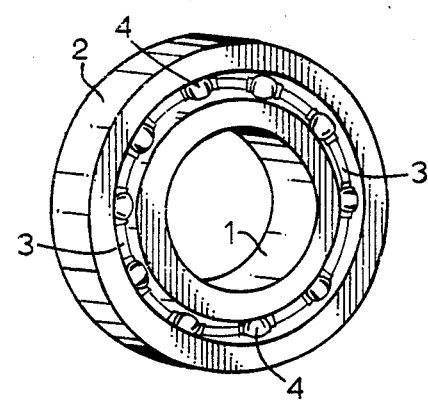
FIG. 1 is a perspective view showing a bearing incorporating my invention.
Figure 2:
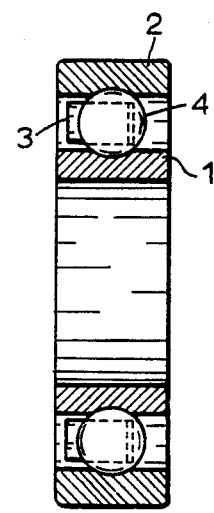
FIG. 2 is a cross-sectional view showing the bearing components in greater detail.

As can be seen, the bearing according to the present invention comprises a cylindrical tubular central shaft or axle 1 which is interconnected to a larger diameter cylindrical external cover or shell 2 through a spacer or cage 3 that maintains a circular array of balls 4 in spaced relation in inner and outer bearing races defined by the shaft and cover respectively. Both the shaft 1 and cover 2 are made of a rigid material which is chemically resistant to water and acids, i.e. nylon, PTFE, acetalic resin or similar plastic material. The balls 4 are preferably molded of a glass presenting a high mechanical resistance, being spaced by spacers 3, made of a material constituted by polyamide or polyacetate material.

Accordingly, the disclosed bearing does not require any kind of maintenance, since it does not need grease or lubricant. Through the utilization of nylon or similar material for the shaft 1 and cover and glass for the balls 4, the bearings are suitable for use in the chemical and photographic industries, for assembling electrical and/or electronic devices, in the field of token-activated automatic machines, and mainly in underwater equipment and apparatus.

Notwithstanding that a preferred embodiment has been described, it must be understood that some alterations can be made without going beyond the scope and the purpose of present invention as hereinafter defined.

What is claimed as new and desired to be secured by Letters Patent of the United States is:

1. A low maintenance machine bearing which does not use grease or any lubricants and is suitable for use in the submarine, chemical, photographic or other industries, said bearing comprising:
   A. a nylon, PTFE, or acetalic resin central shaft which defines an inner bearing race;
   B. a nylon, PTFE, or acetalic resin external cover means which defines an outer bearing race;
   C. a circular array of unlubricated glass balls regularly positioned in said races between said shaft means and said cover means; and
   D. polyamide or polyacetate spacer means located between said shaft means and said cover means for spacing said balls regularly along said races.

* * * * *